(12) United States Patent
Jacobson, III et al.

(10) Patent No.: US 12,422,551 B2
(45) Date of Patent: *Sep. 23, 2025

(54) TOUCHLESS SENSOR AND METHOD FOR RETROFITTING A TOUCHLESS SENSOR INTO PUSH-BUTTON RECEIVER

(71) Applicant: AUDIO AUTHORITY CORPORATION, Lexington, KY (US)

(72) Inventors: Everett G. Jacobson, III, Nicholasville, KY (US); James J. Latimer, Lexington, KY (US); Logan David Poe, Lexington, KY (US); Daniel A. Farnsworth, Irvine, KY (US)

(73) Assignee: Audio Authority Corporation, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,417

(22) Filed: Dec. 12, 2023

(65) Prior Publication Data
US 2024/0103170 A1 Mar. 28, 2024

Related U.S. Application Data

(63) Continuation of application No. 17/355,760, filed on Jun. 23, 2021, now Pat. No. 11,927,671.

(60) Provisional application No. 63/042,829, filed on Jun. 23, 2020.

(51) Int. Cl.
*G01S 17/58* (2006.01)
*F21V 8/00* (2006.01)
*G02B 3/00* (2006.01)
*G06F 3/01* (2006.01)

(52) U.S. Cl.
CPC .............. *G01S 17/58* (2013.01); *G02B 3/00* (2013.01); *G02B 6/0001* (2013.01); *G06F 3/011* (2013.01); *G06F 3/017* (2013.01); *G02B 2003/0093* (2013.01)

(58) Field of Classification Search
CPC ......... G01S 17/58; G02B 3/00; G02B 6/0001; G02B 2003/0093; G06F 3/011; G06F 3/017
See application file for complete search history.

(56) References Cited

U.S. PATENT DOCUMENTS

| | | | |
|---|---|---|---|
| 3,772,484 A * | 11/1973 | Roeser | H01H 23/16 200/437 |
| 8,217,482 B2 * | 7/2012 | Basoor | G01S 17/04 257/E33.059 |
| 8,552,746 B2 * | 10/2013 | Pfau | H03K 17/962 324/658 |
| 8,646,184 B2 * | 2/2014 | Westerfield | B26B 1/046 30/155 |
| 8,872,387 B2 * | 10/2014 | Yoon | H03K 17/9631 307/120 |

(Continued)

*Primary Examiner* — Grant Sitta
(74) *Attorney, Agent, or Firm* — Warren D. Schickli; Stites &Harbison PLLC (57) ABSTRACT

A touchless sensor includes a printed circuit assembly, a light guide and a sensor lens that are carried by a housing. The sensor lens is of hand shape. The housing corresponds in size and shape to a standard 19 mm push-button housing to allow for retrofitting to convert an electronic device from push-button operation to touchless operation.

11 Claims, 5 Drawing Sheets

(56) References Cited

U.S. PATENT DOCUMENTS

| | | | | |
|---|---|---|---|---|
| 8,994,229 | B2* | 3/2015 | Blair | H03K 17/94 340/545.1 |
| 11,754,254 | B2* | 9/2023 | Fong | G02B 19/0028 362/23.04 |
| 11,927,671 | B2* | 3/2024 | Jacobson, III | G06F 3/011 |
| 2005/0073425 | A1* | 4/2005 | Snell | E05F 15/70 340/545.1 |
| 2011/0013378 | A1* | 1/2011 | Silvermint | G09F 13/22 362/97.1 |
| 2013/0030815 | A1* | 1/2013 | Madhvanath | G06F 3/04812 704/E21.001 |
| 2014/0198476 | A1* | 7/2014 | Ikeuchi | H01H 13/023 362/23.05 |
| 2014/0224631 | A1* | 8/2014 | Hanaoka | H01Q 23/00 200/341 |
| 2016/0329894 | A1* | 11/2016 | Buschmann | H03K 17/955 |
| 2019/0287743 | A1* | 9/2019 | Wisniewski | H01H 13/83 |

* cited by examiner

TOUCHLESS SENSOR AND METHOD FOR RETROFITTING A TOUCHLESS SENSOR INTO PUSH-BUTTON RECEIVER

RELATED APPLICATION

This application is a continuation of U.S. patent application Ser. No. 17/355,760, filed on Jun. 23, 2021, which claims priority to U.S. Provisional Patent Application Ser. No. 63/042,829 filed on Jun. 23, 2020, which are hereby incorporated by reference in their entirety.

TECHNICAL FIELD

This document relates generally to the field of touchless sensors and, more particularly, to a new and improved touchless sensor of the proximity or gesture type that may be used to replace existing tactile switches, including common push-button and lever action switches.

BACKGROUND

The recent Covid 19 pandemic has emphasized the advantages of touchless switches and sensors that eliminate the risk of being exposed to a virus that may reside on tactile switch surfaces. Tactile switches include, but are not necessarily limited to, common push-button and lever action switches of the type associated with product demonstration systems for consumer electronic products such as speakers, amplifiers, receivers, phonographs, surround sound systems, home theatre systems and the like.

SUMMARY

In accordance with the purposes and benefits set forth herein, a new and improved touchless sensor is provided. That touchless sensor comprises a motion sensor adapted for detecting an object in a detection zone and a sensor lens between the motion sensor and the detection zone. The sensor lens has a hand shape.

In one or more of the many possible embodiments of the touchless sensor, a housing holds the motion sensor and the sensor lens.

In one or more of the many possible embodiments of the touchless sensor, the touchless sensor further includes a light source and a light guide within the housing. The light guide may be annular in shape. The sensor lens may be received within the light guide. Further, the sensor lens may include a plurality of locator tabs and the light guide may include a plurality of locator tab receivers holding said plurality of locator tabs when the light guide and sensor lens are assembled together.

In one or more of the many possible embodiments of the touchless sensor, the touchless sensor further includes a printed circuit assembly held in the housing, the printed circuit assembly including the motion sensor. The printed circuit assembly may also include a light source that directs light through the light guide around the hand shape of the sensor lens toward the detection zone.

In one or more of the many possible embodiments of the touchless sensor, the housing includes an integral modular pin connector that is connected to the printed circuit assembly. The housing may include a core portion and a shell portion that are connected together to close the housing around the printed circuit assembly, the light guide and the sensor lens. In such embodiments, the integral modular pin connector may be carried on the core portion.

The shell portion may include an end face having a hand shaped sensor window corresponding to the hand shape of the sensor lens. The end face may also include a plurality of indicator windows radially arrayed around the hand shaped sensor window. In some embodiments, the light guide includes a segmented circle for transmission of light and the plurality of indicator windows in the end face correspond to the segmented circle. In some embodiments, the light guide includes a plurality of Cardinal arrows for transmission of light and the plurality of indicator windows in the end face correspond to the Cardinal arrows.

In one or more embodiments, the housing corresponds in size and shape to a standard 19 mm push-button housing. In such embodiments, the touchless sensor is adapted for retrofitting to replace a standard push-button in an electronic device with the touchless sensor in order to allow touchless operation of the electronic device.

In accordance with an additional aspect, a touchless sensor comprises a motion sensor held in a housing corresponding in size and shape to a standard 19 mm push-button housing so as to be adapted to be retrofitted in an electronic device as a replacement for a push-button.

The touchless sensor may further include a modular pin connector integrated into the housing. The touchless sensor may include a light source and a light guide held in the housing.

In accordance with yet another aspect, a method is provided for retrofitting a push-button electronic device with a touchless sensor in order to allow touchless operation of the electronic device. That method includes the steps of disconnecting and removing the push-button from the electronic device and replacing the push-button with a touchless sensor having a housing sized and shaped to correspond to a standard 19 mm push-button housing.

In the following description, there are shown and described several preferred embodiments of the touchless sensor and the method of retrofitting a push-button electronic device with a touchless sensor in order to allow touchless operation of the electronic device. As it should be realized, the touchless sensor and method are capable of other, different embodiments and their several details are capable of modification in various, obvious aspects all without departing from the touchless sensor and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus, the touch sensor and the related method of replacing an existing tactile switch with a touch sensor and together with the description serve to explain certain principles thereof.

Reference will now be made in detail to the present preferred embodiments of the touchless sensor, examples of which are illustrated in the accompanying drawing figures.

DETAILED DESCRIPTION

Figure 1:
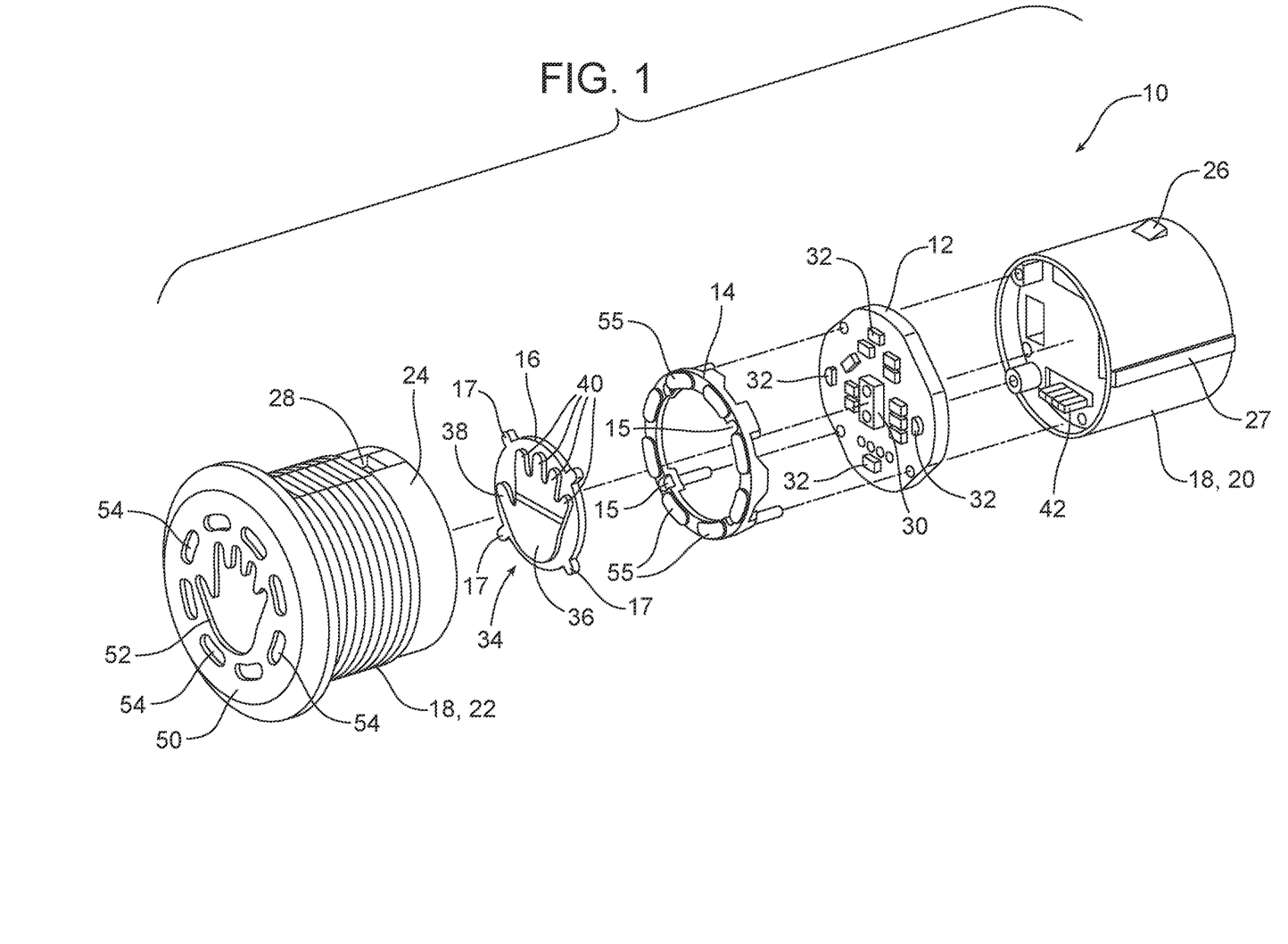
FIG. 1 is an exploded perspective view of the touchless sensor including the housing shell and core, the printed circuit assembly including the motion sensor and the light source, the sensor lens and the light guide encircling the sensor lens.
Figure 2:
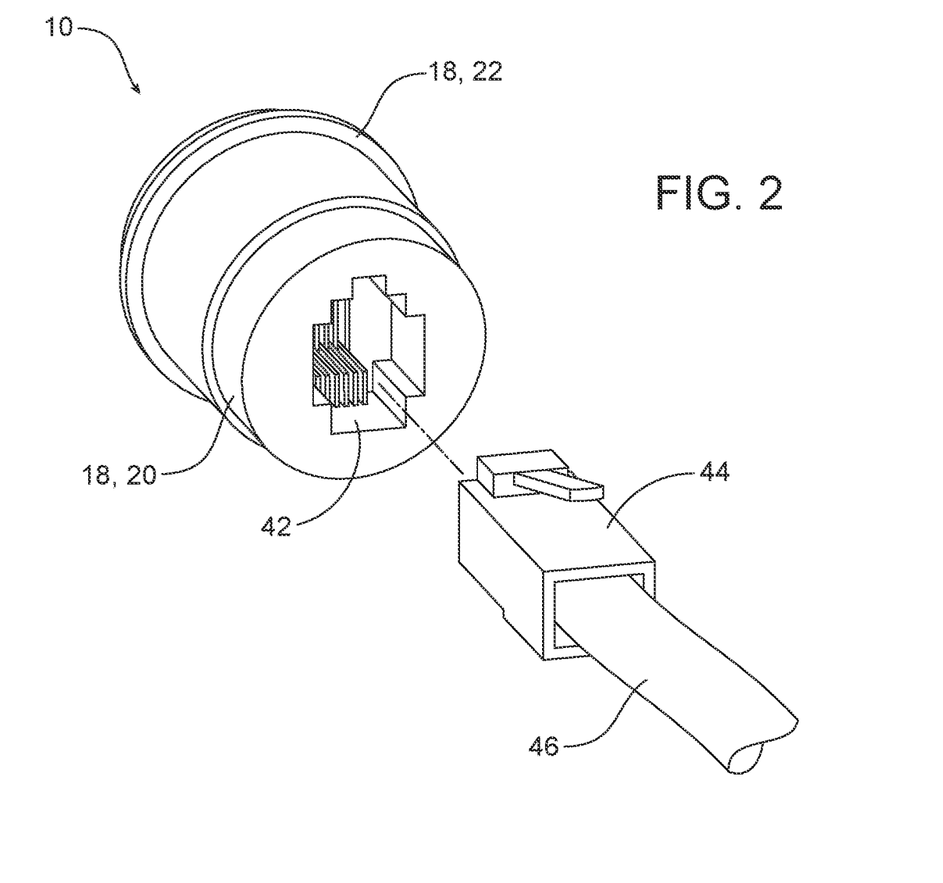
FIG. 2 is a detailed perspective view of the rear of the housing core illustrating the integral modular pin connector and the connector and cable that may be connected to the modular pin connector.

Reference is now made to FIGS. 1 and 2 which illustrate a new and improved touchless sensor 10. As illustrated, the touchless sensor 10 includes a printed circuit assembly 12, a light guide 14 and a sensor lens 16 that are carried by a housing 18. Housing 18 includes a core portion or section 20 and a shell portion or section 22. More specifically, the printed circuit assembly 12, the light guide 14 and the sensor lens 16 are all held in the housing 18.

The housing 18 is closed over the printed circuit assembly 12, light guide 14 and sensor window 16 by sliding the cylindrical portion 24 of the shell 22 over the cylindrically shaped core portion 20 and engaging the tab 26 on the core in the tab receiver 28 on the shell. A rib 27 on the wall of the core 20 engages with a channel (hidden from view) on the inner side of cylindrical portion 24 to keep the tab 26 aligned with the tab receiver 28 during interconnection.

The printed circuit assembly 12 includes a motion sensor 30 and a light source 32. In the illustrated embodiment, the light source 32 comprises four RGB multi-color or single color light emitting diodes (LEDs).

The sensor lens 16 has a hand shape 34 in relief. That hand shape 34 includes a palm 36, a thumb 38 and four fingers 40. The sensor lens 16 may be molded from IR-transmissive acrylic with an IR-blocking acrylic divider.

The housing 18, including the core portion 20 and the shell portion 22 may be molded from plastic or made from other appropriate material. In the illustrated embodiment, the core portion 22 includes an integral modular pin connector 42 that allows connection through a standard pin connector 44 and electrical cable 46 to other electronic components such as an operating hub 48 of a type known in the art. More specifically, the integral modular pin connector may be a RJ9 connector.

In the illustrated embodiment, the light guide 14 is annular in shape. Further, the sensor lens 16 is received within the light guide 14. More particularly, the sensor lens 16 includes a plurality of radially projecting locator tabs 17 while the light guide 14 includes a plurality of locator tab receivers 15 that hold the locator tabs when the sensor lens is seated and nested within the annular light guide.

The shell portion 22 includes an end face 50 incorporating a hand shaped window 52 that corresponds in size and shape to the hand shape 34 of the sensor lens 16. When properly assembled, the hand shape 34 of the sensor lens 16 nests in the hand shaped window 52 of the housing shell 22.

Figure 3A:
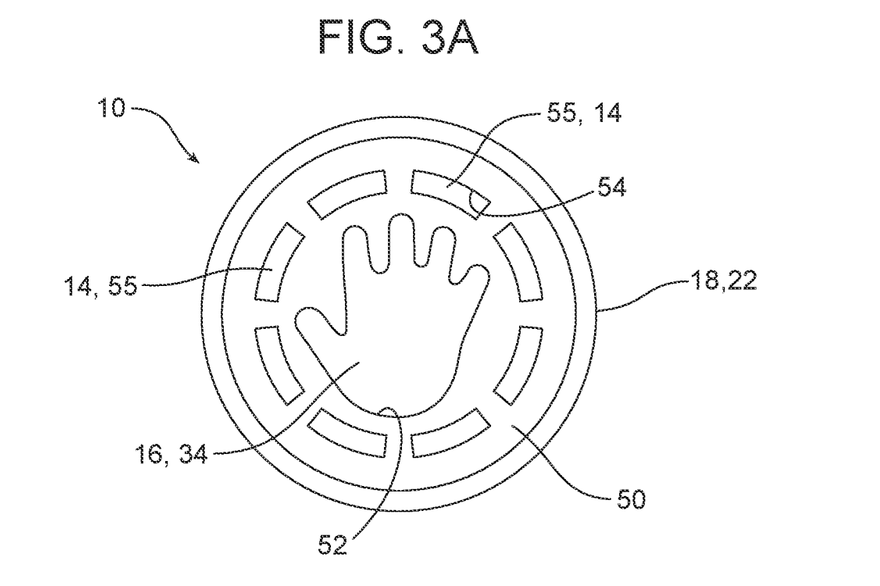
FIG. 3A is a front elevational view of one possible embodiment of the touchless sensor including a plurality of indicator windows in the form of a segmented circle to indicate that the touchless sensor is a simple motion sensor.

The shell portion 22 also includes a plurality of indicator windows 54 radially arranged or arrayed around the hand shaped window 52. In the embodiments of the touchless sensor 10 illustrated in FIGS. 1, 2 and 3A, the light guide 14 includes a segmented circle 55 for the transmission of light and the plurality of indicator windows 54 form a corresponding segmented circle around the hand shaped sensor window 52. Such an arrangement of indicator windows 54 identifies the touchless sensor 10 of FIGS. 1, 2 and 3A as a simple presence or proximity sensor.

Figure 3B:
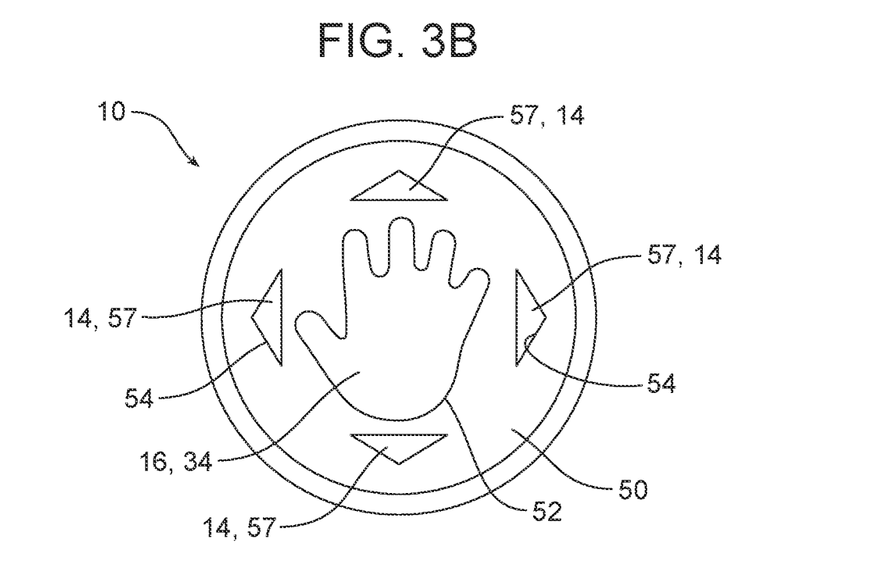
FIG. 3B is a front elevational view of another possible embodiment of the touchless sensor including a plurality of indicator windows in the form of Cardinal arrows, pointing up, down, to the left and to the right to indicate that the touchless sensor is a gesture sensor.

In the embodiment of the touchless sensor 10 illustrated in FIG. 3B, the light guide 14 includes four Cardinal arrows 57 for the transmission of light and the plurality of indicator windows 54 radially arrayed around the hand shaped sensor window 52 are four corresponding Cardinal arrows oriented upward, downward, to the left and to the right. Such an arrangement of indicator windows 54 identifies the touchless sensor 10 of FIG. 3B as a gesture sensor.

The touchless sensor 10 of FIGS. 1-3B are designed to reliably detect an object in a detection zone Z in front of the end face. More specifically, the embodiment of FIGS. 1-3A detects the proximity or presence of any object in the detection zone Z. In contrast, the embodiment of the touchless sensor 10 illustrated in FIG. 3B detects movement of the object in the detection zone Z. The touchless sensor 10 is suited for a variety of applications, including retail demonstration, equipment control, and public works equipment such as elevators and pedestrian crossing devices. Many of these applications involve replacing existing tactile switches, including common pushbuttons and lever-action switches. However, the applications for the touchless sensors 10 extend far beyond replacing manually operated switches. Touchless sensors 10 can detect movement or the presence of an object over a wide range of distances. In the case of a human or an animal, the sensor can detect motion or presence and make appropriate decisions without the person or animal being aware of being detected.

The touchless sensors 10 can detect presence from a few millimeters to about 2 meters. The sensitivity of the sensors 10 can be selected during installation or adjusted during operation. One embodiment of the sensors 10 allows both speed and direction of motion to be detected.

The touchless sensors 10 are able to provide immediate visual feedback to the user with the programmable light source 32. Both single color and multiple color displays may be used in the sensors 10, depending on the application. Multiple LEDs allow animation to provide not only acknowledgement that a command was received, but also confirmation that the correct command was interpreted. Variable intensity allows animation for the LED display to feel natural, not robotic.

All decision making based on motion and presence sensing, as well as visual feedback, is typically done within the sensor assembly itself, meaning that very few additional components are required for operation. For applications where another computer or logic device will be controlling the system operation, the sensors 10 can operate in a "terminal" mode, sending numerical data about movement and presence, and receiving commands that control the visual LED display.

Motion detection and interpretation allows one to use intuitive gestures as an interface and control means. When used in an interactive application, the sensors 10 can utilize adaptive learning technology to more properly interpret the intent of the user, even when the user's motion is inconsistent.

The physical design of the sensor window 52 and the hand shape 34 of the sensor lens 16, easily differentiates the sensors 10 visually from common tactile pushbuttons. The motion sensor gesture versions also incorporate the four arrows 57 to indicate motion sensing and provide confirming user feedback. Further, the sensors 10 are designed with the housing 18 sized and shaped to replace industry standard tactile switches which fit in a 19 mm diameter hole.

The touchless sensor 10 may be used in several ways. These include as a stand alone replacement for industry standard illuminated switches, with a basic hub of a type known in the art (e.g. a part number HX-100 hub available from the Audio Authority Corporation of Lexington, Ky.) that provides power and wiring terminals for direct connection to third party equipment or with an intelligent controller hub of a type known in the art (e.g. a part number HX-200 hub available from the Audio Authority Corporation of Lexington, Ky.) that communicates with equipment, computers, MODEMs, routers, or other equipment using high-speed serial interfaces.

Examples of typical systems using the touchless sensor 10 include:
1. One or more touchless proximity sensors with single-color LEDs, used with a basic hub to replace multiple tactile switches in a retail demonstration application.
2. Several touchless proximity sensors, plus one or more motion-detecting sensors with multiple color LEDs, used with an intelligent controller hub, connected to a media center, for the purpose of comparing consumer audio and/or video equipment.
3. Sensors and intelligent controller hub as in #2 above, connected to a piece of industrial equipment, such as a conveyor or spooler/unspooler for the purpose of safely controlling the equipment and making real-time adjustments.
4. Sensors and intelligent controller hub as in #3 above, connected to food processing equipment, such as a mixer, oven, fryer, or automated processing device, for the purpose of controlling the process without manually contacting the equipment.
5. Sensors and intelligent controller hub as in #4 above, connected to medical or surgical equipment, for the purpose of controlling or adjusting the equipment without risking contamination when manually contacting the equipment.
6. Sensors and intelligent controller hub as in #5 above, connected to CAD, musical composition, or computer-generated animation equipment and/or software, for the purpose of more efficiently transforming human movement to component design, musical composition, or computer-generated animation.
7. A single motion/gesture sensor used for cursor/pointer navigation in a graphical user interface to control a software application.

Figure 4:
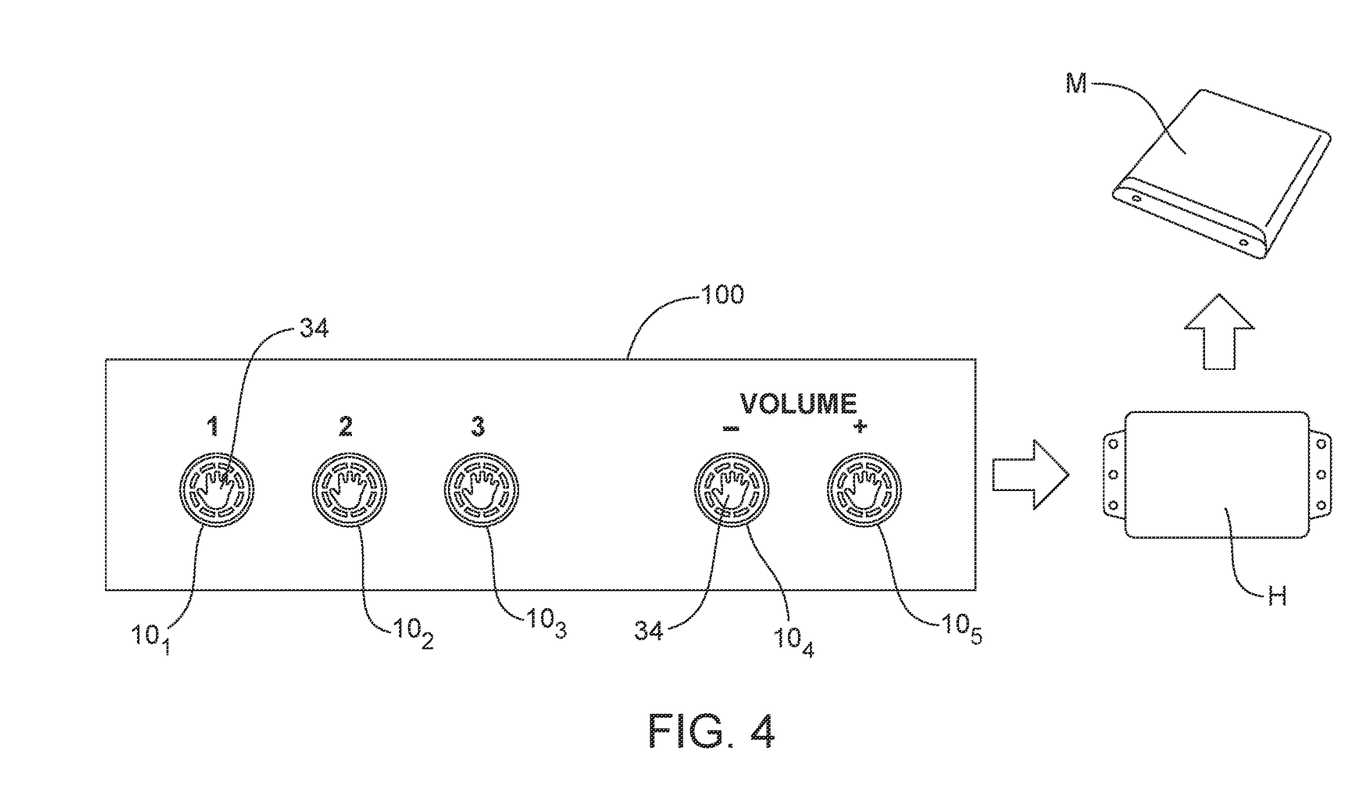
FIG. 4 is a schematic representation of an electronic control unit including five touchless sensors to provide selection and control of electronic consumer products for demonstration and comparison.

Reference is now made to FIG. 4 which shows an electronic control unit or display 100 including five touchless sensors $10_1$, $10_2$, $10_3$, $10_4$ and $10_5$. The touchless sensors $10_1$, $10_2$, $10_3$, $10_4$ and $10_5$ have been retrofitted into an existing display by replacing three standard 19 mm product select buttons for products "1", "2" and "3" and two volume control buttons "−" and "+" with the respective touchless sensors $10_1$, $10_2$, $10_3$, $10_4$ and $10_5$. The touchless sensors $10_1$, $10_2$, $10_3$, $10_4$ and $10_5$ are connected by electrical cables, such as illustrated in FIG. 2 at reference numbers 44 and 46, to a hub H of a type known in the art. The hub H outputs connect to the original media player M or other device to be controlled by the touchless sensors $10_1$, $10_2$, $10_3$, $10_4$ and $10_5$.

The touchless sensors $10_1$, $10_2$, $10_3$, $10_4$ and $10_5$ replicate the push-button operation of the replaced switches but without touch. Thus, moving the hand over touchless sensor $10_1$ selects product "1" for demonstration. Moving the hand over touchless sensor $10_2$ selects product "2" for demonstration. Moving the hand over touchless sensor $10_3$ selects product "3" for demonstration. Moving a hand over touchless sensor $10_4$ turns the volume of the selected product down. Moving a hand over touchless sensor $10_5$ turns the volume of the selected product up.

Figure 5:
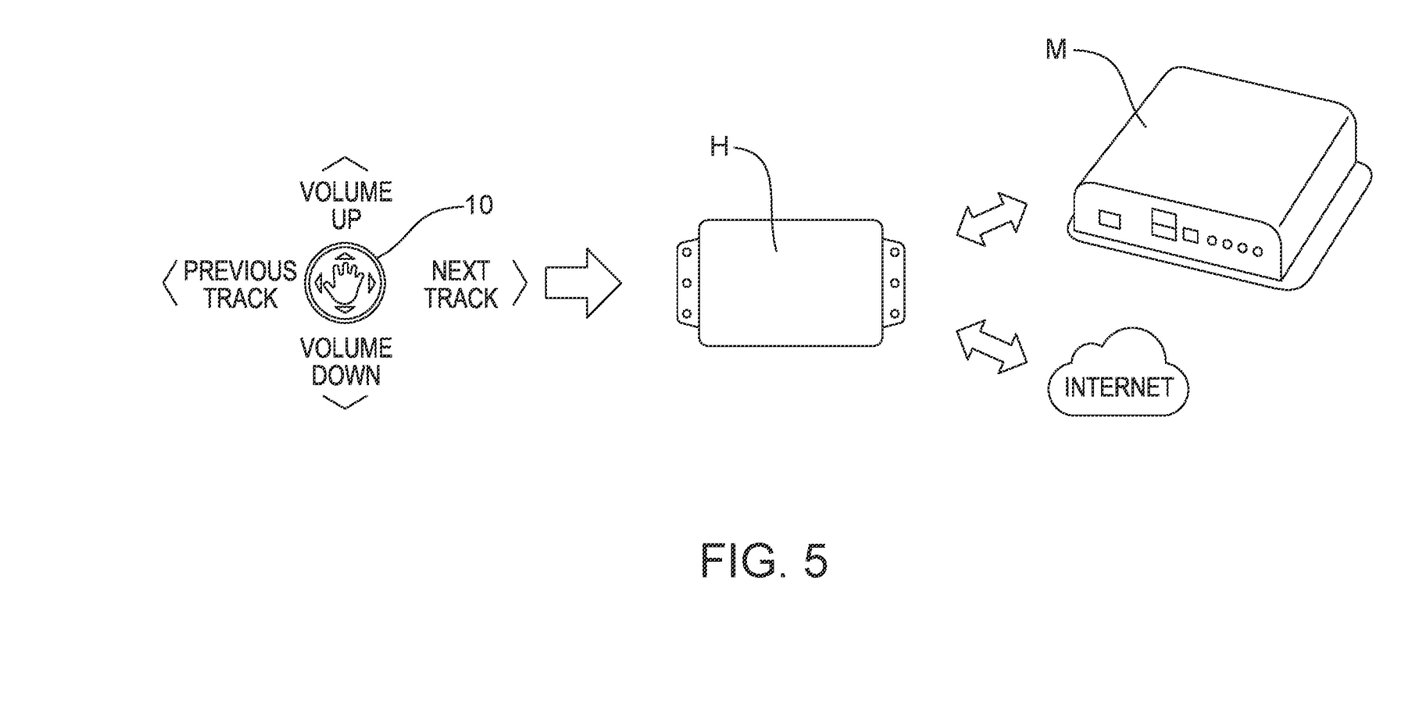
FIG. 5 is a schematic representation of an electronic control unit including a single touch sensor of the type illustrated in FIG. 3B allowing single point gesture navigation of an electronic product such as a digital media player.

FIG. 5, illustrates a single touchless sensor 10 of the gesture type that is illustrated in FIG. 3B. This sensor 10 interprets gestures providing a complete navigation interface to control a multimedia server, replacing an array of up to five individual pushbuttons. As noted above, the touchless sensor 10 fits a standard 19 mm switch receiver or aperture and connects to the hub H by a snap-in cable as illustrated at FIG. 2 by reference numbers 44 and 46. The hub H can connect to individual push-button ports on the media player M, or it can be connected via a serial port or USB cable. Some hubs H can also collect and report analytics and system health information via the internet.

In this case, a hand movement to the left in front of the sensor 10 changes the music being played to the previous track. In contrast, a hand movement to the right in front of the sensor 10 changes the music being played to the next track. A hand movement in front of the sensor 10 in an upward direction turns the volume up. A hand movement in front of the sensor 10 in a downward direction turns the volume down. A hand covering the sensor or uncovering the sensor are also recognizable gestures. A cover gesture will pause or resume playback in this case.

The following briefly describes the assembly steps for the touchless sensor 10.
I. Printed Circuit Assembly
  a. 1. Apply circuit components to printed circuit board
    i. Apply solder paste to top side of printed circuit board panel using solder stencil
    ii. Auto pick and place top side circuit components to the top side of the panel.
    iii. Perform top side pre-reflow inspection.
    iv. Reflow solder top side circuit components using forced air convection oven
    v. Perform top side post-reflow inspection
    vi. Apply solder paste to bottom side of printed circuit board panel using solder stencil
    vii. Auto pick and place bottom side circuit components to the bottom side of the panel.
    viii. Perform bottom side pre-reflow inspection
    ix. Reflow solder bottom side components using forced air convection oven
    x. Perform bottom side post-reflow inspection
II. Final Sensor Assembly
  b. 1. Assemble printed circuit assemblies into sensor housings
    i. Affix Printed Circuit Assembly (Item 12. in assembly FIG. 1) onto connector pins 42 of Sensor Housing Core (Item 20. in assembly FIG. 1).
    ii. Place Light Guide (item 14. in assembly FIG. 1) and Sensor Lens (item 16. in assembly FIG. 1) into Sensor Housing Shell (item 22. in assembly FIG. 1.)
    iii. Insert Sensor Housing Core 20 into Sensor Housing Shell 22
  c. 2. Functional test
    i. Perform functional test of Finished Sensor Assembly A method for retrofitting a push-button electronic device with a touchless sensor in order to allow touchless operation of the electronic device includes the steps of disconnecting and removing the push-button from the electronic device and replacing the push-button with a touchless sensor 10, as described above having a housing 18 sized and shaped to correspond to a standard 19 mm push-button housing.

The foregoing has been presented for purposes of illustration and description. It is not intended to be exhaustive or to limit the embodiments to the precise form disclosed.

Obvious modifications and variations are possible in light of the above teachings. All such modifications and variations are within the scope of the appended claims when interpreted in accordance with the breadth to which they are fairly, legally and equitably entitled.

What is claimed:

1. A touchless sensor, comprising:
    a motion sensor adapted for detecting an object in a detection zone;
    a sensor lens between the motion sensor and the detection zone, the sensor lens having a hand shape, whereby the object is detected by the motion sensor through the sensor lens having the hand shape;
    a housing holding the motion sensor and the sensor lens; and
    a printed circuit assembly held in the housing, the printed circuit assembly including the motion sensor and a light source that directs light through a light guide around the hand shape of the sensor lens toward the detection zone wherein the housing includes an integral modular pin connector that is connected to the printed circuit assembly.

2. The touchless sensor of claim 1, wherein the light guide is annular in shape.

3. The touchless sensor of claim 2 wherein the sensor lens is received within the light guide.

4. The touchless sensor of claim 3, wherein the sensor lens includes a plurality of locator tabs and the light guide includes a plurality of locator tab receivers holding said plurality of locator tabs.

5. The touchless sensor of claim 1, wherein the housing includes a core portion and a shell portion that are connected together to close the housing around the printed circuit assembly, the light guide and the sensor lens.

6. The touchless sensor of claim 5, wherein the integral modular pin connector is carried on the core portion of the housing.

7. The touchless sensor of claim 6, wherein the shell portion of the housing includes an end face having a hand shaped sensor window corresponding to the hand shape of the sensor lens.

8. The touchless sensor of claim 7, wherein the end face includes a plurality of indicator windows radially arrayed around the hand shaped sensor window.

9. The touchless sensor of claim 8, wherein the light guide includes a segmented circle for transmission of light and the plurality of indicator windows in the end face correspond to the segmented circle.

10. The touchless sensor of claim 8, wherein the light guide includes a plurality of Cardinal arrows for transmission of light and the plurality of indicator windows in the end face correspond to the Cardinal arrows.

11. The touchless sensor of claim 7, wherein the housing corresponds in size and shape to a standard 19 mm pushbutton housing.

* * * * *